March 17, 1959　　　H. L. RAFFMAN　　　2,878,389
CASSETTE
Filed Nov. 24, 1954　　　　　　　　　　5 Sheets-Sheet 4
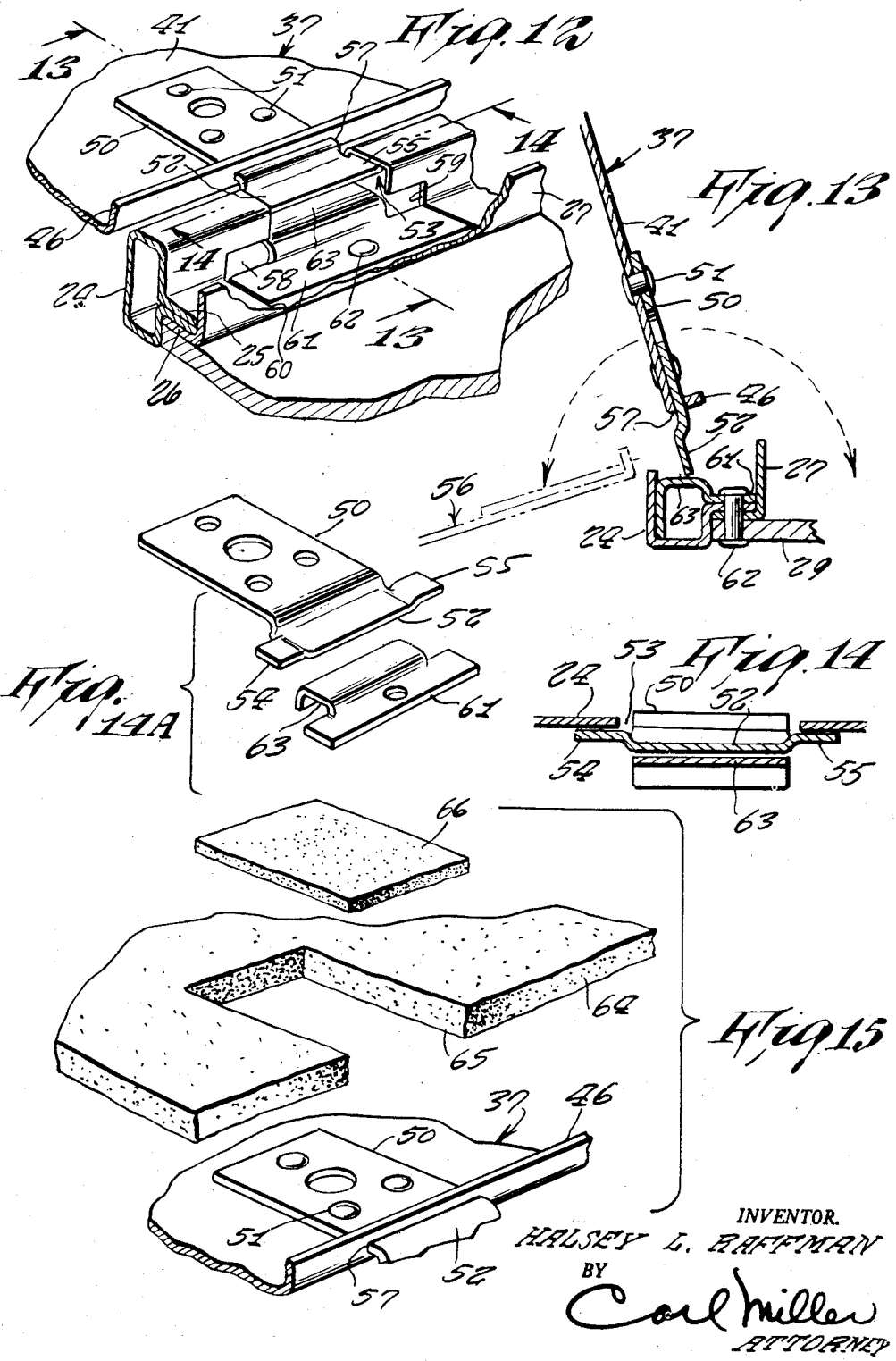
INVENTOR.
HALSEY L. RAFFMAN
BY
Carl Miller
ATTORNEY

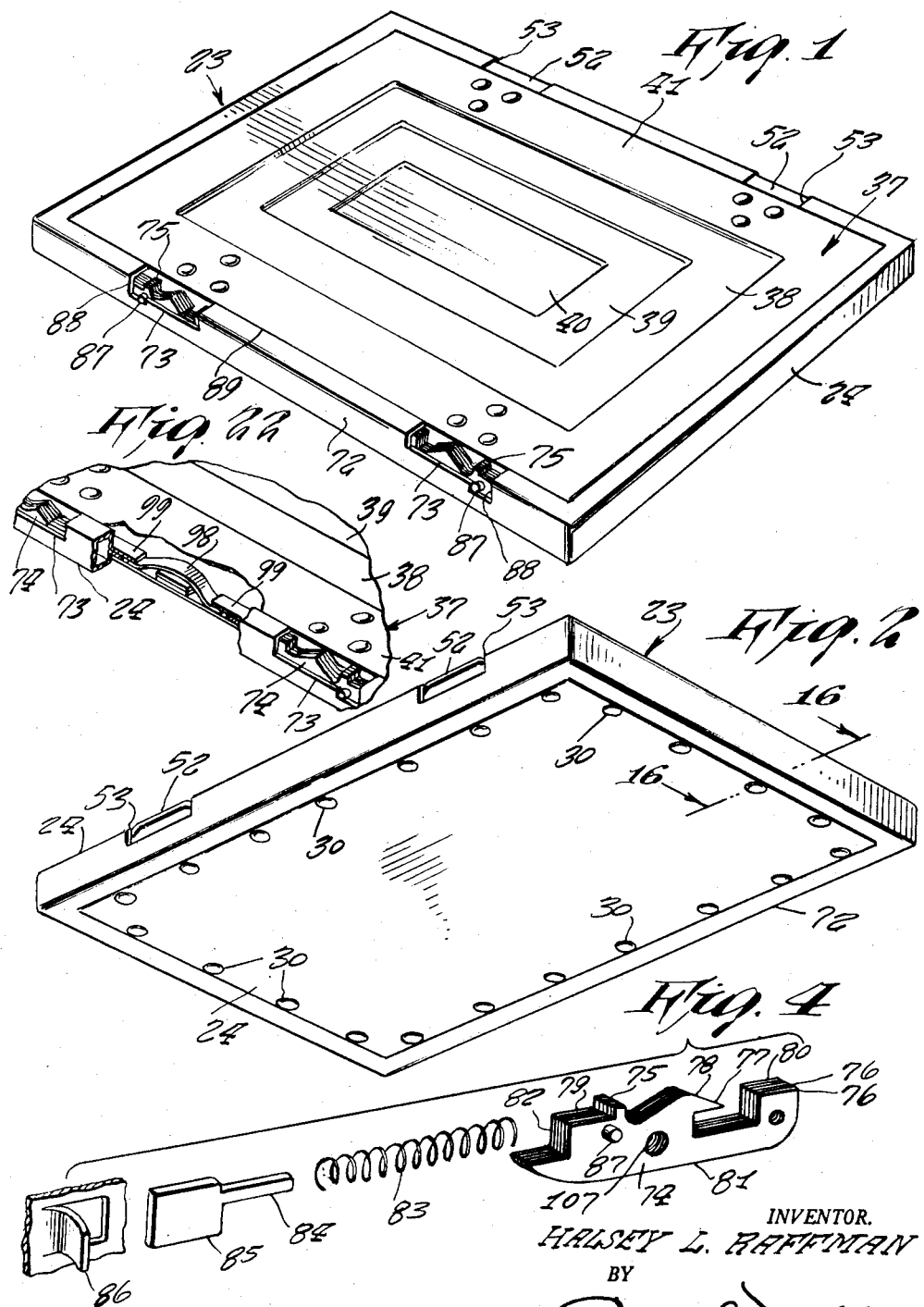

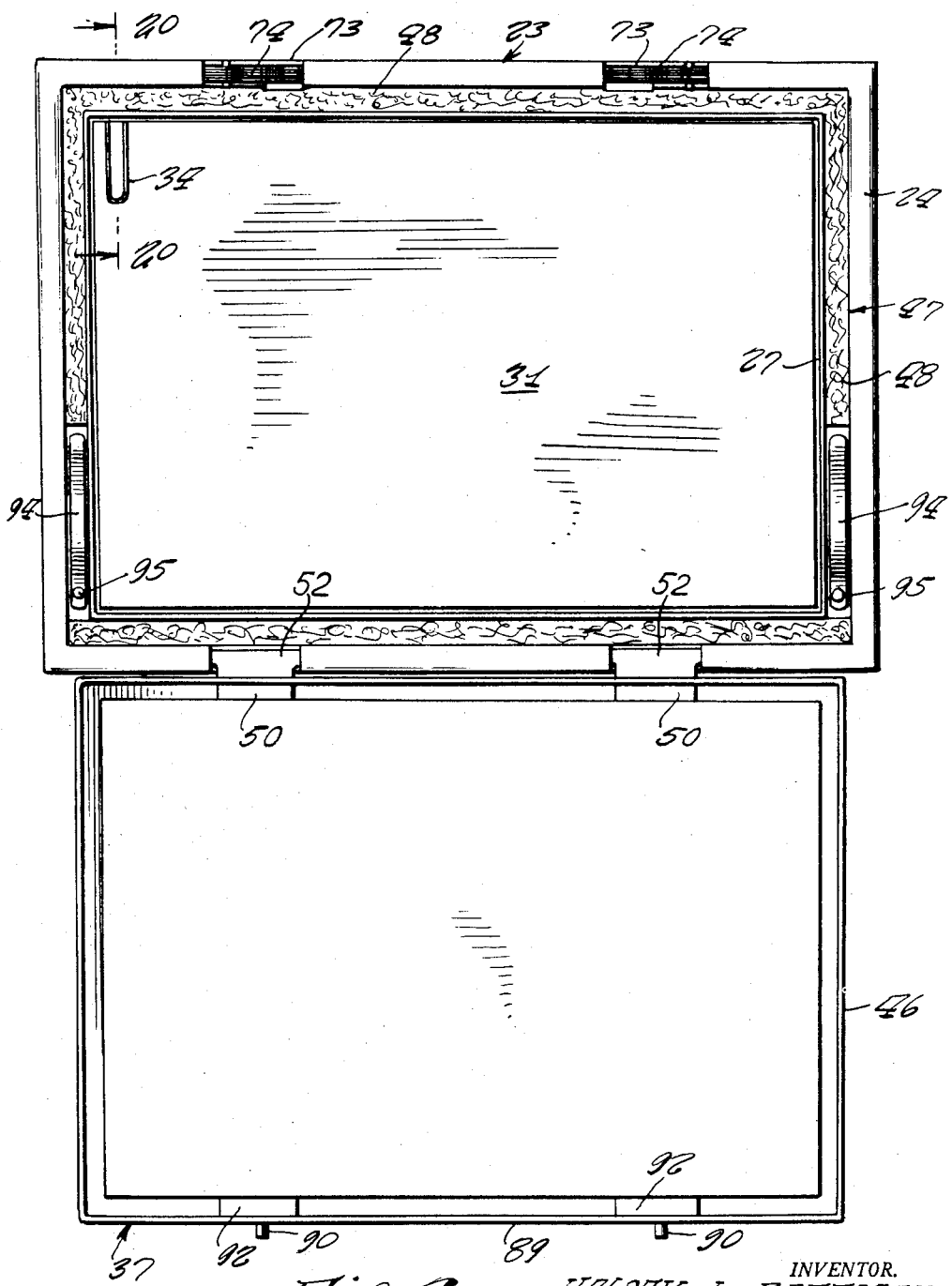

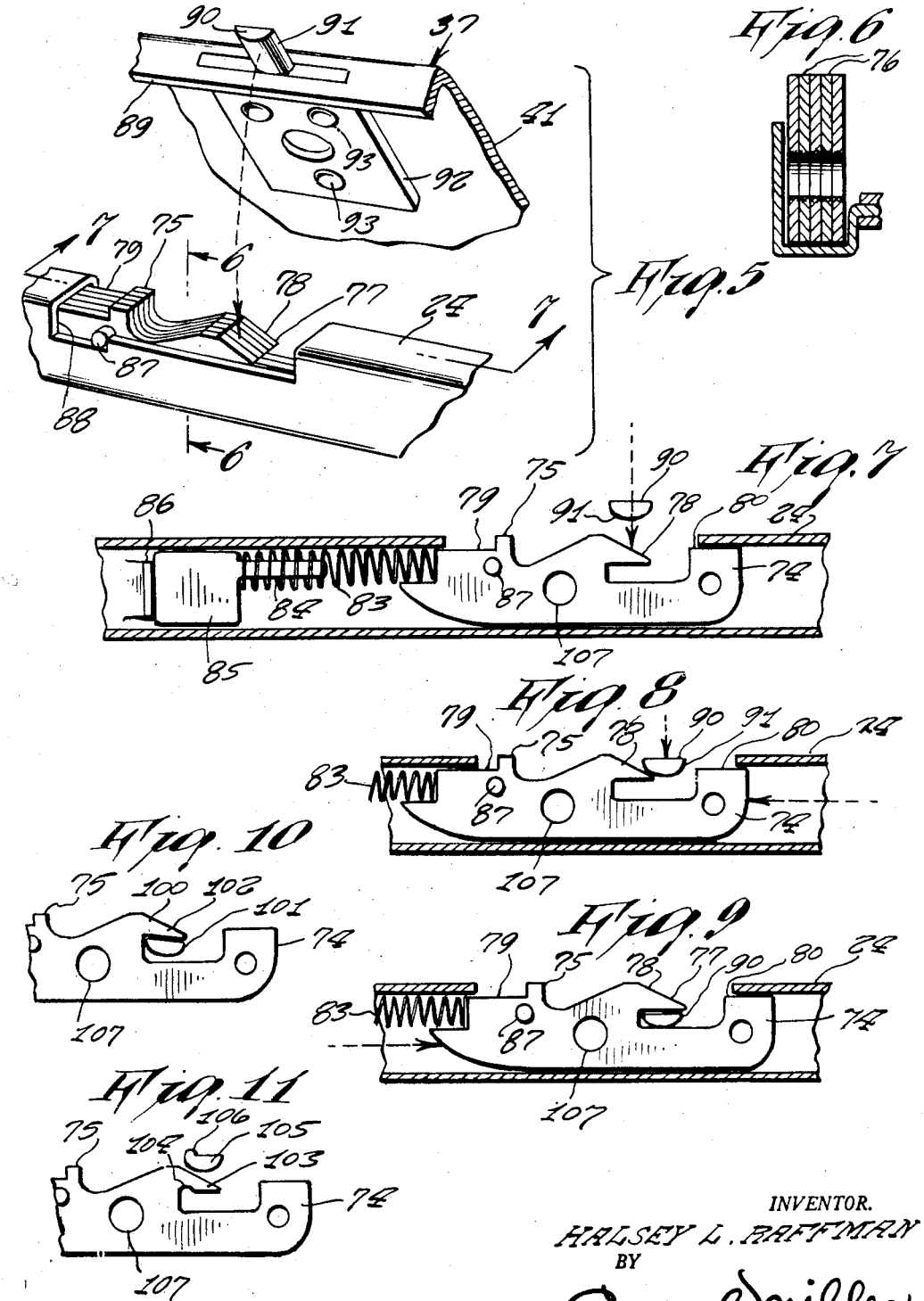

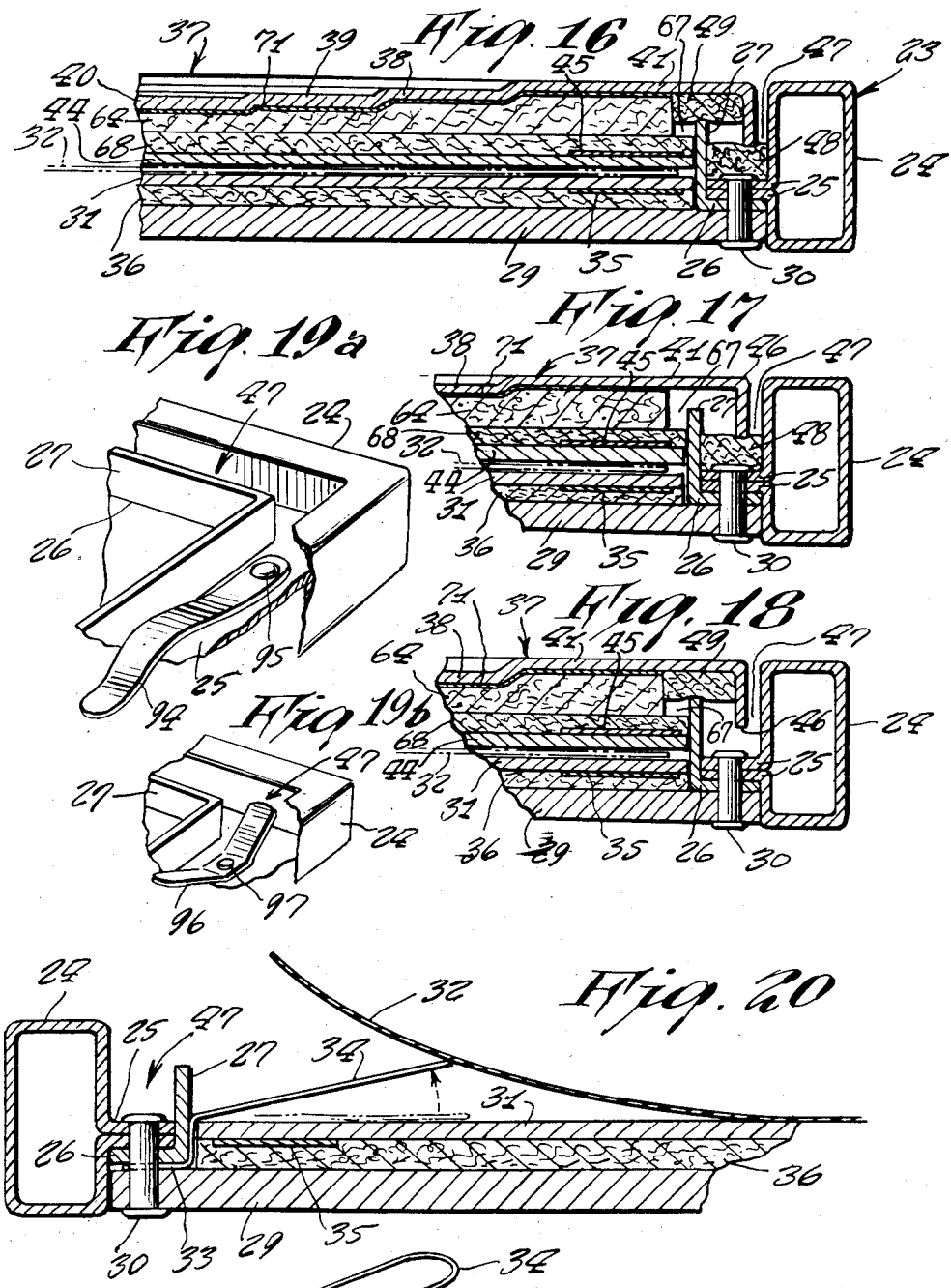

United States Patent Office 2,878,389
Patented Mar. 17, 1959

2,878,389

CASSETTE

Halsey L. Raffman, Brooklyn, N. Y.

Application November 24, 1954, Serial No. 470,891

8 Claims. (Cl. 250—68)

The present invention relates to plate and film holders and the like that are suitable for use with X-rays and invisible light.

The main object of my invention is to provide a special cassette for use with X-rays in medical and industrial radiography, so that images are formed upon a film temporarily sealed within the cassette of the invention.

An important object of the invention is especially to have such a cassette that is light, thin and so rigid as to be virtually warp proof under severe conditions of use.

Another object of my invention is also to provide such a cassette with a light proof front panel that is perfectly transparent to X-rays, and a door which when closed has an effective light seal about the edges thereof.

A further object is to have the cassette provided with such a rigid cover or door that the same will not bend or collapse from any cause during use of the cassette.

Yet another object is to have the cassette provided with releasable locks so arranged that even if one lock is accidentally released, the other will still retain the cover closed.

It is likewise an object, withal to so construct this cassette that when the locks or latches are released, the cover or door will tend to spring open in order to facilitate removal of an exposed film and insertion of a fresh film.

An overall object is likewise to have the cassette of such novel and effective construction that it intensifies the image registered upon the film therein and definitely protects the same until removed for development by the radiologist or technician.

Other objects and advantages of my invention and its application to actual use will appear more fully in detail as the specification proceeds.

In order to facilitate ready comprehension of this invention for a proper appreciation of the salient features thereof, the invention is illustrated on the accompanying drawings forming part hereof, and in which:

Figure 1 is a perspective view of a cassette made according to the principles of my invention and embodying the same in a practical form; the cassette being closed and seen from above (back surface);

Figure 2 is a bottom perspective view of the same cassettes showing the front surface.

Figure 3 is a plan view of the cassette in fully open position, as when lying open upon a table or the like;

Figure 4 is an exploded view of the elements forming one of the locks which normally is recessed in the frame;

Figure 5 is an enlarged fragmentary perspective view of a lock and latch in assembled operative position prior to closure;

Figure 6 is a vertical transverse section as taken on line 6—6 in Figure 5;

Figure 7 is a vertical longitudinal section taken on line 7—7 in Figure 5;

Figure 8 is a partial section similar to Figure 7 showing an advanced stage in closing the door or cover beyond that shown in said Figure 7;

Figure 9 is also a similar view to that of Figure 7 showing the final closed stage of the latch or lock when the cover is fully closed;

Figure 10 shows a modification of the lock or latch of Figures 4 to 9, inclusive.

Figure 11 illustrates a further modification of the latch;

Figure 12 is a perspective view of a hinge of the cassette, the latter being shown in fragmentary form to locate the hinge and being open to reveal details of the same more fully;

Figure 13 is a vertical section as taken on line 13—13 in Figure 12;

Figure 14 is a vertical longitudinal section taken on line 14—14 in said Figure 12;

Figure 14A is a perspective view showing the hinge and rocker only;

Figure 15 is an exploded fragmentary perspective view of part of the same portion of the cover or door as shown in Figure 12 demonstrating how general uniformity of padding is maintained over the hinge areas of the cassette;

Figure 16 is a vertical partial section of the cassette as taken on line 16—16 in Figure 2;

Figure 17 is a similar section showing a modification;

Figure 18 is another section showing another modification;

Figure 19a is a fragmentary perspective view illustrating a door opening spring facilitating opening the door or cover when the latches have been released;

Figure 19b is another such section showing a modification of the leaf spring of Figure 19a;

Figure 20 is a sectional view of part of the cassette as taken on line 20—20 in Figure 3, showing film raising clip in position;

Figure 21 is a perspective view of a film raising spring;

Figure 22 is another modification of the lid or cover raising spring of Figures 19a and 19b.

Throughout the views, the same reference numerals indicate the same or like parts.

When radiologists and technicians desire to take a series of X-ray photographs of a patient at home or in a hospital, or possibly in a field hospital at or near a battle field, it is important that this be done without unnecessarily burdening the technician involved. This becomes self-evident when it is considered that he perhaps has several patients to deal with and must handle a number of such exposures in order to provide efficient service for the doctors and surgeons desiring accurate information regarding the condition of such patients. It is therefore acutely necessary to be in a position to have at hand a large number of cassettes ready for use in the most efficient manner possible. The same considerations are also applicable to industrial radiology or photography.

It is thus obvious that such cassettes must be far advanced in design and concept over those heretofore known, for they must be light in weight, thin and yet absolutely rigid, as well as exceedingly easy to handle, as well as swiftly opened and closed in most convenient manner as possible. In addition, such a cassette must be altogether free from any distortion or warping due to dampness or heat.

Upon duly considering this problem, I have succeeded in producing a novel and convenient cassette along the lines already disclosed, as will now be set forth in detail in the following.

Hence, in the practice of my invention, and referring also again to the drawings, the present cassette, generally indicated at 23 primarily includes a hollow or solid metal or plastic bounding frame 24, preferably of stainless steel or other metal or alloy or solid plastic or solid magnesium or aluminum that has a rectangular form and inwardly has a pair of flanges 25 brought together to lie in contact in a single plane. Beneath this double inward flange 25 is located an angle frame 26 with an upstanding flange 27 forming a deep channel or trough 47 serving as part of a light lock or labyrinth, of which more farther on.

The mentioned angle frame is secured in place above a bottom panel 29 of metal or plastic by means of a series of rivets 30, 30, etc. extending through the double flange 25 of frame 24, so that this frame, the angle frame and metal bottom panel form a rigid unit serving as the basic body of the cassette. Within the rectangular area bounded by angle frame flange 27 is located a flat pad, preferably of foam felt rubber type, cemented upon the inner surface of bottom panel 29, while upon this pad in turn is cemented an intensifying flat screen 31. Of course, the pad could well be made of felt, if desired, and the screen of treated plastic or even of lead. The most effective pad would be made of a combination of foam or sponge rubber, felt or cork. In any event, the film indicated at 32 is intended to lie upon the screen 31, and in order to initially release it, at one corner, beneath one of the rivets 30, and in fact beneath the angle frame 26 is secured a spring loop 33 extending up over screen 31 in elongated loop form at 34, as best seen in Figures 3, 20 and 21, thus causing one corner of the film to be raised as soon as the cassette is opened. Incidentally, it should be noted, as may be seen in Figures 16, 17, 18 and 20 that the screen has a flat strip of double faced tape 35 immediately beneath it on the rubber cushion or pad 36 tending to keep the screen in place, being located just within the outer edges thereof, so as to be completely concealed beneath the screen. Naturally, the location of the pad or cushion 36 beneath this screen provides a resilient support for the film, allowing it to be held flat, as will be noted in connection with means for holding it down on the screen.

For the latter purpose, the cassette is provided with a cover or door 37 having a cover panel of sheet aluminum or alloy formed with up to three or more successively depressed areas or recess portions 38, 39 and 40 in addition to the first or uppermost level 41 that forms the marginal portion of the panel. The first depressed area or margin 38 is of a given depth of about twenty thousandths of an inch below the level of outer margin 41, the second depressed portion 39 about one half the depth or about ten thousandths of an inch below portion 38. The central depressed area 40 is about five thousandths of an inch below the level of the second recessed portion 39, all three recessed portions serving to impart rigidity to the cover and also tend to press down a rubber composition pad 64 toward the previously mentioned screen 31 when the cover is closed. Beneath the rubber pad is cemented a felt or other porous pad 58 to which is secured a second screen 44 adhered by double faced tape 45, as in the case of screen 31.

The cover thus described is best seen in Figures 1, 3, 16, 17 and 18, and is provided with a marginal bounding flange 46 directed downwards to co-operate in a special manner with upright flange 27 of the cassette body to shut out light. For this purpose, the marginal space or groove 47 between inner flange 27 and the outer hollow cassette frame 24 is provided with a light sealing cushion 48 of felt, cork, rubber, etc., against which the cover flange 46 normally presses when the cover or door is fully closed, so that no light will be able to pass flange 46 into the cassette and reach the film 32. This groove or labyrinth with its flange 27 and the interposed door flange 46 engaging with flexible light sealing strip 48 effectively blocks all light from the interior of the cassette, but the construction is susceptible to slight variation.

For example, Figure 17 shows the structure just described, while in Figure 16, a further strip of such light sealing material 49 is inserted into the cover immediately within flange 46 for engagement by the cassette flange 27 simultaneously with engagement of the cover flange 46 with strip 48 within frame 24, this being a preferred form. On the other hand, as shown in Figure 18, the strip 49 in the cover is alone used without any strip of material between flange 27 and frame 24.

Before noting the manner in which the cover is padded interiorly, it should be stated that for the present purpose, a special hinge construction is included that utilizes an advantage afforded by the nature of the outer cassette frame 24. Thus, as best seen in Figures 3, and 12 to 15, the cassette has two hinges spaced apart and each consisting primarily of a hinge plate 50 secured to the cover by means of rivets 51 and having a depressed extension 52 adapted to project into a cut out portion or gap 53 in the frame 24; the extension having two opposite projections 54, 55 projecting into the hollow interior at each end of the gap in frame 24. These projections 54, 55 in a sense serve the function of hinge pins or pivot pins for each, albeit they are not a close fit within the frame 24 but allow enough leeway for the cover to provide for its opening to about 185° instead of the usual 180°, as indicated at 56 in Figure 13. The cover flange 46 is slotted at 57 for each hinge plate to project therethrough beyond the cover to frame 24.

In order to allow initial insertion of the hinge pivot projections 54 and 55 and thus provide clearance when attaching the cover, the hollow frame 24 has its gap 53 widened at both ends below the top as shown at 58, 59. However, the upper flange 25 similarly has a gap 60 to receive a blocking plate 61 held by a rivet 62 and provided with a lug 63 disposed beneath hinge member 52 to prevent accidental displacement of the hinge from its connection with the frame 24 by simple obstruction.

Naturally, as the cassette body contains a pressure pad, in similar fashion, the cover contains a basic pressure pad 64, as seen in Figures 15 to 18, there being cut a gap 65 for each hinge plate 50, and a relatively thinner pad section 66 overlaid upon this plate to arrive at the same uniform height of pad upon the cover. Within the edges of the cover, pad 64 is cut back sufficiently to form a continuous gap or channel 67 to receive strip 49 and the flange 27 of frame 24. Upon pad 64 is mounted an upper thinner pad 68 similar to pad 36 already described, having double faced tape 45 similar to frame 35 applied to the same, and finally an intensifying screen 44 attached to pad 68 directly facing screen 31 of the cassette body. It is to be particularly noted that a lead or lead alloy sheet 71 is interposed between the cover top 41 and the basic pad 64 to absorb back scatter secondary radiation. The X-ray intensifying screens may be of any type, such as calcium, tungstate, fluoride, lead, or a combination of these chemicals. Of course, some other hinges, pads and screens may be used within the purview of my invention.

Inasmuch as the construction as a whole is directed to making the cassette as thin and wafer-like as possible, the invention includes special manually released locks along one edge 72 of the casing or body for normally retaining the cover closed. Hence, two spaced apart gaps 73, 73 along the edge 72 are provided for accommodating a pair of laterally opposed slidable locks 74, 74 housed in the hollow frame 24 and each having an upwardly projecting finger piece 75 by which to manually slide the lock from normal locking position. Each lock is built up of a plurality of laminations 76, 76 riveted or welded or even brazed together into a unit that has a hooked portion 77 forming the lock proper thereof. Each of the laminated slidable locks 74, as more especially shown in Fig. 4, is provided with a cylindrical hole or opening 107 for the specific purpose of retaining a permanent lubrication therein and which facilitates easy operation of said slidable locks. The upper surface of this lock is inclined at 78, while at both ends, the lock is provided with equivalent guide portions 79, 80 to slide beneath the top portions of hollow frame 24, the vertical thickness of the lock from the bottom edge 81 to the tops of guides 79, 80 being uniform from end to end, except for finger piece 75 and locking hook 77. At one end distant from the locking hook, the lock has a recess portion 82 for receiving one end of a compression spring 83 impaled on a guide bar 84 projecting from a plate 85 within frame 24, in one wall of which is a stop lug 86 struck out from this wall to block movement of plate 85 and thus provide the spring 83 with a proper backing to tend to drive the lock 74 into locked position.

Furthermore, each lock has a short stop pin 87 traveling in a short path within the open slot 88 in gap 73 to limit movement of the lock. In corresponding positions along the edge 89 of the cover are located a pair of latch projections 90, 90 with rounded lower faces 91, 91 adapted to engage slidably upon the inclined surfaces 78 of the locks 74 when the cover is closed down. Each latch member 90 is an integral projection from a latch plate 92 secured to the cover upon the inner side thereof by rivets 93, 93, and being of such small cross section that when the cover is pressed down, the projection in each case slides the lock beneath it aside until the latch projection slips down past the locking hook 77 and the latter slides over the projection under impulse of spring 83, locking the cover closed. The locks 74, 74 are directed in opposite directions so that when the cassette is accidentally dropped and possibly one lock is caused to open, the other will remain closed. But when the cover is to be opened to insert or replace a film between the two screens, applying the thumbs to the finger pieces 75, 75 and pulling apart, the two locks will release the latch projections 90, 90 and the cover will be free to be opened, note Figures 4 to 9, inclusive.

It is desirable to have the cover so equipped that it will tend to spring at least partly open when the latches are released. For this purpose, within the ends of the cassette body are located a pair of arched leaf springs 94, 94 secured by rivets 95, 95 in the side or marginal grooves 47, 47 in effective positions to be engaged by flange 46 of the cover when the latter is closed down, as will be noted from Figures 3 and 19a. When the latches are released, these springs will raise the cover suddenly and thus start the opening of the cover in very effective manner. The spring may be modified and take the form of spring 96 held by rivet 97 as shown in Figure 19b, if so desired. Then again, within the marginal channel 47 may be secured an arched leaf spring 98 having both ends slidable beneath a pair of lugs 99, 99 and adapted to be engaged by the cover flange along edge 89 for initially opening the cover when the latches are released.

In the same manner as the raising springs may be modified, so also may the lock be modified as shown in Figures 10 and 11, for the lock 100 of Figure 10 may have the lower edge inclined downwards to increase the locking effect on inclined latch 101 as shown at 102. The lock 103 of Figure 11 has an undercut groove or notch 104 so located that it will receive the latch 105 and seat the end projection or rib 106 thereon in notch 104 and thereby retain the latch more securely than as first described.

In any event, the construction allows the cassette as a whole to be lighter than usual, very thin, and rigid against distortion.

Manifestly, variations may be resorted to, and parts and features may be further modified than as indicated or substituted or used without others within the scope of the appended claims.

Having now fully described my invention, I claim:

1. A cassette comprising, in combination, a substantially rectangular frame having a bounding and inwardly disposed flange means located in a single plane, a substantially flat panel fixed to said flange within the bounding frame to form the cassette body, a cover therefor including a substantially flat panel having a flange extending about the entire peripheral edge of said frame, hinge means carried by the edge of a cover hingedly connected to the coresponding edge of the cassette body, manually operated lock means upon the opposite edge of the cassette body and corresponding latch means upon the corresponding opposite edge of the cover cooperating therewith to releasably lock the cover in a closed position, pressure pads within the cassette body and cover confining a film therebetween, light sealing means preventing high rays from entering between said cassette body and the cover when said cover is closed, said bounding frame being of metallic and hollow construction defining an air space extending around said panel, the inwardly directing flange means including a pair of flanges lying in contact within a single plane and having the panel secured upon one of said flanges, said hinge means including a pair of hinge plates projecting from one edge of said cover, the hollow bounding frame on the corresponding edge of said cassette body having a gap within which said plates extend, a pair of pivot projections upon the end of each plate projecting into the hollow frame from the ends of each gap, a distinct stop plate secured upon the cassette body adjacent to each hinge plate preventing it from becoming disengaged from the frame at each gap, the edge opposite the hinge means having a pair of gaps and a pair of locks that are laterally slidable in the hollow bounding frame in said gaps, and each lock includes a locking hook with an inclined upper surface, the cover being provided with a pair of corresponding latch plates provided with a pair of projecting latch members adapted to catch beneath said locking hooks and having rounded lower surfaces to engage upon the inclined upper surface of the locks, said locks having upwardly directed finger pieces by which to slide them into a releasing position, the locking hooks being directed in opposite directions, and a compression spring located within the hollow frame in the vicinity of each lock having one end engaging against the respectively adjacent lock to urge the same into closing position with respect to the corresponding latch projection of the cover.

2. A cassette according to claim 1, wherein the bounding frame of the cassette body has an angle frame substantially co-extensive with the panel within the bounding frame and secured to the inwardly directed flange means, with one angle of the angle frame forming an upright marginal flange spaced a short distance within the bounding frame and wherein the resulting marginal channel between the one angle of the angle frame and the bounding frame contains a narrow strip of light sealing material against which the cover flange engages in closed position of the cover.

3. A cassette according to claim 2, wherein the cover has a marginal channel between the flange thereof and the pressure pad in said cover occupied by a second light sealing strip of material in position to be engaged by the marginal flange of the cassette body.

4. A cassette according to claim 1, wherein each lock has a pair of aligned end guide portions for guiding the locks in sliding movement within the body bounding frame, and each lock consists of a plurality of metal laminations of similar profile secured together to form lock units, each lock having a stop pin and the hollow bounding frame forming a housing therefor and having a limited open slot for the stop pin limiting sliding movement of the lock in each case.

5. A cassette according to claim 4, wherein the locking hook upon each lock is inclined downwards and the corresponding surface of the latch projection is similarly inclined to increase the locking effect of the lock.

6. A cassette according to claim 4, wherein the locking hook in each case has an undercut notch within the inner end thereof and the latch projection in each case has a corresponding rib or upwardly extending projection fitting the notch in closed condition of the cover and locked condition of the locks and latch members.

7. A cassette according to claim 4, wherein each of the laminated slidable locks is provided with a cylindrical opening approximately located in the center of said locks, whereby said openings retain a permanent lubrication therein for said locks.

8. A cassette according to claim 4, wherein the metal laminations individually have a generally straight bottom upon which to slide into locking or releasing positions and an upper profile with the operative ends thereof at substantially the same level for engaging beneath the upper edge of the hollow frame interior and an upwardly projecting stop upon one end portion which end portion also has an upper end recess for receiving the end of a compression spring urging the lock formed by the laminations into locking position, and wherein a plate is located in the hollow frame a predetermined short distance from the lock or latch and has a guide bar projecting toward said latch therefrom for receiving the other end of the spring thereon.

References Cited in the file of this patent

UNITED STATES PATENTS

| | | |
|---|---|---|
| 866,214 | Perks | Sept. 17, 1907 |
| 1,352,615 | MacLagan | Sept. 14, 1920 |
| 1,933,652 | Boldingh | Nov. 7, 1933 |
| 2,103,961 | Wilmanns | Dec. 28, 1937 |
| 2,213,437 | Wolf | Sept. 3, 1940 |
| 2,298,587 | Raffman | Oct. 13, 1942 |
| 2,666,855 | Gacki et al. | Jan. 19, 1954 |
| 2,694,153 | Reuter | Nov. 9, 1954 |

FOREIGN PATENTS

| | | |
|---|---|---|
| 597,782 | France | Sept. 11, 1925 |